(12) United States Patent
Sutton et al.

(10) Patent No.: US 11,726,818 B1
(45) Date of Patent: Aug. 15, 2023

(54) SYSTEM FOR EXECUTING TASKS IN DIFFERENT PROGRAMMING LANGUAGES

(71) Applicant: Black Rock, Inc., San Francisco, CA (US)

(72) Inventors: Nick Sutton, London (GB); Jenö Kovács, Gyömrö (HU); Sylvain Olivier Eric Cheroutre, London (GB); Philippe Benjamin de Koning, London (GB)

(73) Assignee: BlackRock, Inc., San Francisco, CA (US)

( * ) Notice: Subject to any disclaimer, the term of this patent is extended or adjusted under 35 U.S.C. 154(b) by 339 days.

(21) Appl. No.: 17/076,322

(22) Filed: Oct. 21, 2020

(51) Int. Cl.
*G06F 9/46* (2006.01)
*G06F 9/48* (2006.01)
*G06F 9/445* (2018.01)
*G06F 9/30* (2018.01)
*G06F 9/50* (2006.01)
*G06F 9/455* (2018.01)

(52) U.S. Cl.
CPC ........ *G06F 9/4881* (2013.01); *G06F 9/30043* (2013.01); *G06F 9/44505* (2013.01); *G06F 9/4552* (2013.01); *G06F 9/5016* (2013.01)

(58) Field of Classification Search
CPC .............. G06F 9/4881; G06F 9/30043; G06F 9/44505; G06F 9/4552; G06F 9/5016
See application file for complete search history.

(56) References Cited

U.S. PATENT DOCUMENTS

2015/0294426 A1* 10/2015 Nezhad ................. G06Q 50/01
                                                      705/319
2019/0370288 A1* 12/2019 Bequet ............... G06F 16/9014

* cited by examiner

*Primary Examiner* — Tammy E Lee
(74) *Attorney, Agent, or Firm* — Haynes and Boone, LLP (57) ABSTRACT

Systems, methods, and computer program products for executing a sequence of tasks are provided. An analytics engine receives a request to execute a group of tasks, where tasks execute in different programming languages. A sequence for executing the tasks in the group of tasks is determined using the input and output parameters of the tasks. The tasks are executed according to a determined sequence. To execute each task, the analytics engine instantiates a process that corresponds to programming language associated with the tasks. The process executes the task. Once all tasks complete execution, an output of the last task is a result of the group of tasks.

20 Claims, 8 Drawing Sheets

SYSTEM FOR EXECUTING TASKS IN DIFFERENT PROGRAMMING LANGUAGES

TECHNICAL FIELD

The disclosure generally relates to executing tasks in computing environments, and more specifically to executing a sequence of independent tasks written in different programming languages.

BACKGROUND

Conventional computing systems or applications invoke tasks that are written in the same programming language. When the tasks are written in the same programming language and are associated with the same application, the dependencies between tasks are known. Further, when tasks are compiled into executable objects, the compiler determines the sequence for executing these tasks. However, when different applications invoke tasks that are written in different programming languages, the dependencies among tasks and the sequence for executing these tasks are not known. This results in an inefficient and time-consuming process, where a user initially installs programs that may execute the programming language the corresponds to different tasks, manually verifying an existence of data that is manipulated by each task, and then determining whether the task had generated an output prior to executing the next task.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The embodiments are directed to an analytical system for sequentially executing unrelated tasks written in different programing or implementation languages. Specifically, a task may include one or more methods that are written in an implementation language specific to the task. For example, a first task may be written in a first implementation language and a second task may be written in a second implementation language that is different from the first implementation language. The methods in the task may manipulate data that the task receives and generate output data. The task is independent of other tasks and does not know that other tasks may exist in the analytical system. The data, however, may flow from task to task and be manipulated by different tasks.

In some embodiment, a group of tasks may be executed sequentially. When tasks are executed sequentially, data that is an output of the first task may be an input to the second task. Further, data that is an output of the second task may be in an input to a third task. The sequence continues until the last task in the group of tasks generates an output. The output of the last task may be a result associated with the group of tasks.

Because each task in the group of tasks in independent from other tasks, an analytics engine may determine the sequence in which the tasks in the group may be executed. To determine the sequence, the analytics engine determines the input and output parameters of each task. The first task in the sequence is the task that includes input parameters that do not match the output parameters of other tasks in the group of tasks. The match may be between all or a designated subset of output parameters of the first task and the input parameters of other tasks. The second task in the sequence is a task that includes the input parameters that match the output parameters of the first task. If, for example, two tasks include the input parameters that match the output parameters of the first task, then these two tasks may be executed as a second task and a third task in the sequence. The analytics engine continues this process until either all tasks in the group of tasks have been executed, or until the analytics engine identifies the last task in the sequence. The last task is the task includes the output parameters that do not match the input parameters of other tasks in group.

Because each task may be written in a different implementation language, the analytics engine may instantiate a process to execute the task based on the implementation language. For example, for a task that is implemented in Python, the analytics engine may instantiate a Python process to execute the methods in the task. For a task that is written in C#, the analytics engine may instantiate a C# process to execute the methods in the task. Once instantiated, the process may receive data, manipulate the data as specified in the methods, and generate an output. The output may serve as an input to the next task in the sequence.

Notably the above process for executing tasks is automatic. This is because the analytics engine determines the sequence of tasks, and instantiates a process to execute each task until an output is generated for the group of tasks. The analytics engine may also determine which processes may be executed sequentially or in parallel.

Further description of the embodiments is discussed below.

Figure 1:
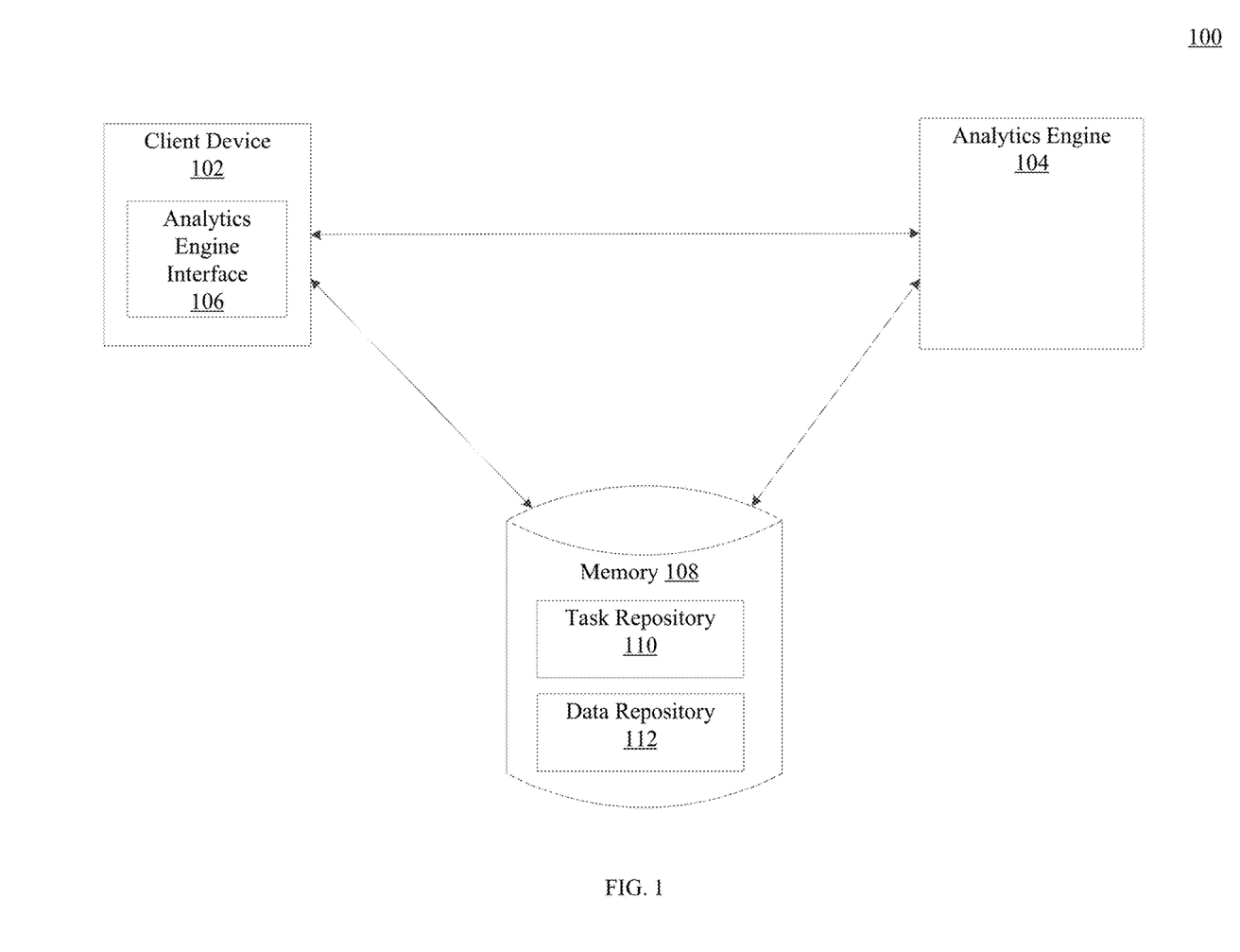
FIG. 1 is an exemplary system where embodiments can be implemented.

FIG. 1 is an exemplary system 100 where embodiments can be implemented. System 100 includes one or more client or computing devices 102 and an analytics engine 104.

Computing devices 102 may be portable or non-portable electronic devices under the control of a user and configured to transmit, receive, and manipulate data from analytics engine 104. Example computing devices 102 include desktop computers, laptop computers, tablets, smartphones, wearable computing devices, eyeglasses that incorporate computing devices, implantable computing devices, etc.

Computing device 102 may include an analytics engine interface 106. Analytics engine interface 106 may be pre-installed on computing device 102, installed on computing device 102 using portable memory storage devices, such as compact disks or thumb-drives, or be downloaded to the computing devices 102 from one of external servers. Analytics engine interface 106 may execute on computing device 102 and receive instructions and data from a user or from analytics engine 104. Although not shown, analytics engine 104 and analytics engine interface 106 may be included on the same computing device, such as computing device 102.

In some embodiments, analytics engine interface 106 may receive user input. An example user input may include data, configuration(s) associated with data, instructions for manipulating data, instructions for grouping tasks into a group, etc. Similarly, analytics engine interface 106 may display an output. An example output may include manipulated data, configuration(s), instructions, etc. Analytics engine interface 106 may also receive instructions for inclusion in different methods that are included in the tasks or instructions for configuring a task definition that is further described below.

System 100 may also include analytics engine 104. Analytics engine 104 may be communicatively coupled to analytics engine interface 106 and one or more memories 108. For discussion purposes only, FIG. 1 illustrates a single memory 108. Analytics engine 104 may be configured to execute multiple tasks. These tasks may be computer programs that are written in different programming or implementation languages, such as C, C++, Go, Java, JavaScript, Python, Excel, Scala, etc. Because the tasks are written in different programming languages, each task may be executed using a different process that is specific to a programming language associated with the task. The tasks are also loosely coupled to each other. In other words, the execution of each task is independent of other tasks and each task does not know about the existence of other tasks. The loose coupling may occur when the data that is an output of one task may be an input to the second task. In some embodiments, analytics engine 104 may sequentially link the execution of several tasks. For example, analytics engine 104 may identify the input(s) and output(s) parameters of each task and using the input(s) and output(s) parameters determine the sequence of a group of tasks. In this way, the data may flow from one task to another task and may be manipulated by multiple tasks.

In some embodiments, the function of each task may be defined by the methods that are written in the implementation language associated with the task. In this case, tasks may be different computer programs that each operate on data, where each task is written in a different implementation language.

Tasks, when executed as a group, may have different uses. In one example, a group of tasks may include tasks for configuring a portion or different components of a network, where each task performs a particular configuration function. When these tasks are executed as a group, the tasks may configure an entire network. In another example, a group of tasks may include tasks for integrating different views on a balance sheet by different entities within a company, such as a managerial entity, a risk entity, and a finance entity, where each task corresponds to each entity. In this case, when the task that corresponds to a managerial entity executes that task and generates an output, the task that corresponds to a risk entity may receive the output of the managerial task and then further manipulate the data and generate an output that may be an input to a task that corresponds to a finance entity. The finance entity may further manipulate the data and generate a result for the data the corresponds to the managerial, risk, and finance entities. In another example, each task may include an implementation code for a model. An implementation code for a model may model data or analyze data using predefined mathematical relationships or algorithms. In this case, a group of tasks may include multiple models, with each model sequentially modeling the data that has been manipulated by previous models.

In some embodiment, analytics engine interface 106 may configure tasks into a group. For example, all tasks in the same group may be configured to include an identifier. Analytics engine 104 may recognize the tasks in a group using the group identifier. The tasks in a group may be sequentially executed by the analytics engine as discussed below.

Analytics engine interface 106 may receive instructions to execute a group of tasks. Once received, analytics engine interface 106 may transmit a request to execute a task or a group of tasks to analytics engine 104. The request may include a group identifier. Analytics engine 104 may receive the request, and identify the tasks in the group using the group identifier. Analytics engine 104 may then determine the sequence of tasks in the group, execute the tasks according to the sequence, generate an output, and transmit the output back to analytics engine interface 106. Analytics engine interface 106 may receive and display the output using Hypertext Markup Language (HTML), cascading style sheets (CSS), scripting language, such as JavaScript, or the like.

In some embodiments, system 100 may include memory 108. Memory 108 may be a memory that is conducive for large scale storage, such as a database, a file system, a large non-volatile memory or may be one of the memories descried in FIG. 8. Also, memory 108 may include more than one memory where each memory is equipped for long-term storage or short-term storage of data. Memory 108 may also be communicatively coupled to analytics engine 104 and analytics engine interface 106.

In some embodiments, memory 108 may include a task repository 110 and a data repository 112. Task repository 110 may include definitions for tasks and methods that are associated with each task. An example task definition may include input parameter(s), output parameter(s), implementation language in which the source code for the model or task is written, and the methods or names of methods that may be implemented in the implementation language and include scripts, classes, functions, etc. In some embodiments, a task definition may be configured using analytics engine interface 106. Once configured, analytics engine interface 106 may transmit the task definition for storage to task repository 110.

Data repository 112 may include data on which tasks operate. The data may be uploaded to or retrieved from data repository 112 using analytics engine interface 106. Analytics engine 104 may also retrieve the data from data repository 112, manipulate the data using one or more tasks, and then store the manipulated data back into data repository 112.

In an embodiment, analytics engine interface 106 may utilize numerous components included in computing device 102 to receive input, store and display data, and communicate with analytics engine 104. Analytics engine 104 may also execute on a computing device or another computer or server and utilize numerous computer components. Example components are discussed in detail in FIG. 8.

Figure 2:
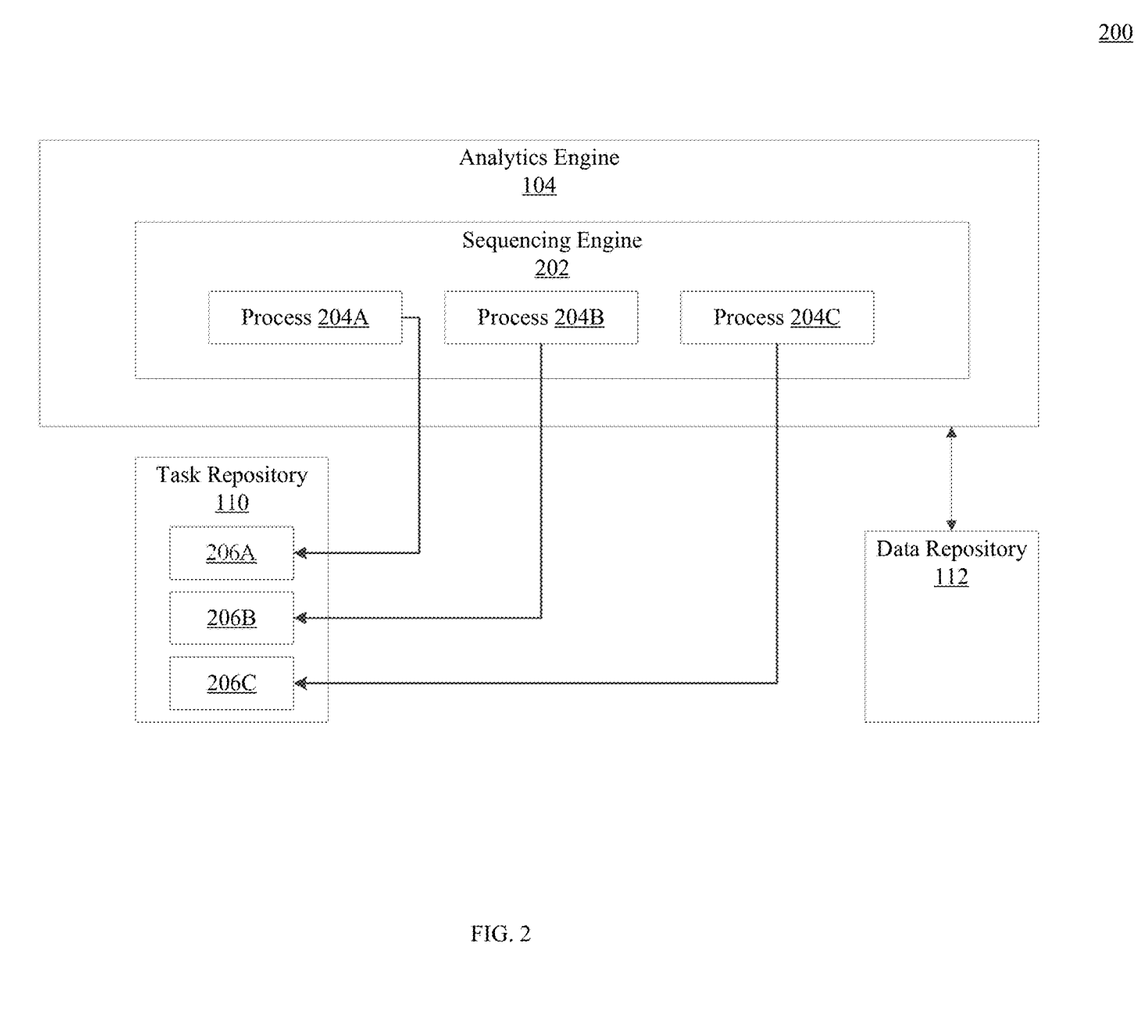
FIGS. 2 and 3 are block diagrams of an analytics engine, according to an embodiment.

FIG. 2 is a block diagram 200 of an analytics engine, according to an embodiment. As illustrated in FIG. 2, analytics engine 104 includes a sequencing engine 202. Sequencing engine 202 may instantiate different processes 204A-C that may execute tasks 206A-C. For example, for task 206A that is written in an Excel code, sequencing engine 202 may instantiate process 204A that may execute an Excel code. Similarly, for task 206B that is written in a C# code, sequencing engine 202 may instantiate process 204B that may execute the C# code. In another example, for task 206C that is written in a Python code, sequencing engine 202 may instantiate process 204C that may execute the Python code. Notably, sequencing engine 202 is not limited to the above discussed source code languages and may instantiate processes 204 that execute other types of source code. Once sequencing engine 202 instantiates processes 204A-C, each one of processes 204A-C may execute within analytics engine 104 independently of other processes in processes 204A-C. Processes 204A-C may also execute independently of sequencing engine 202. In particular, processes 204A-C may perform the methods included in the task definition of a corresponding task. Further processes 204A-C may execute either sequentially or in parallel.

To execute tasks 206A-C, sequencing engine 202 may retrieve tasks 206A-C from task repository 110. Alternatively, sequencing engine 202 may retrieve task definitions from task repository 110, while processes 204A-C may retrieve the methods associated with task definitions from task repository 110.

Sequencing engine 202 may determine tasks 206 or a group of tasks that may be executed. For example, suppose analytics engine 104 receives a request to execute a group of tasks that includes tasks 206A-C. The request may identify tasks 206A-C or may include an identifier that may be associated with a group that includes tasks 206A-C. When the request includes an identifier, sequencing engine 202 may map the identifier in the request to a group of tasks 206A-C. The mapping between the identifier and the group may be stored in task repository 110, sequencing engine 202 or elsewhere in analytics engine 104.

Once sequencing engine 202 determines tasks 206A-C that may be executed, sequencing engine 202 may determine the sequence in which tasks 206A-C execute. To determine the sequence, sequencing engine 202 may retrieve task definitions for tasks 206A-C from task repository 110 or a memory internal to sequencing engine 202, and use the task definitions to identify the input and output parameters of each task in tasks 206A-C. Once the input and output parameters are identified, sequencing engine 202 may identify a task in tasks 206A-C that has input parameters that do not match the output parameters of other tasks and identify this task as a first task. For illustration purposes, suppose sequencing engine 202 identifies task 206A as the first task. Once task 206A is identified, sequencing engine 202 may identify from the task definition associated with task 206A the implementation language in which the methods in task 206A are written. For illustration purposes, the implementation language for task 206A may be Excel. Next, sequencing engine 202 may generate an instance of a process that corresponds to the implementation language and processes the methods associated with task 206A. For illustrative purposes, this process may be process 204A that executes Excel code. Process 204A may retrieve methods associated with task 206A using the task definition and execute the methods. In some embodiments, process 204A may retrieve data that corresponds to the input parameters from data repository 112, manipulate the data using the methods, and store the manipulated data back into data repository 112.

After sequencing engine 202 completes executing task 206A, sequencing engine 202 may select a next task from tasks 206B-C to execute. To select the next task, sequencing engine 202 may compare the output parameters of task 206A as defined in the task definition for task 206A to the input parameters of other tasks, such as tasks 206B-C. Suppose, for illustrative purposes, that the output parameters of task 206A match the input parameters of task 206B as defined in the task definition for task 206B. In this case, sequencing engine 202 begins to execute task 206B by instantiating a process, such as process 204B, that executes the implementation language in which the methods in task 206B are written. For illustrative purposes the methods may be written in C#. Once instantiated, process 204B may execute the methods in C# independent from other processes or from sequencing engine 202. As discussed above, process 204 may retrieve data from the data repository 112 that is requested by the methods in task 206B. The data may include data that corresponds to the input parameters of task 206B. Further, the data that is an input data to task 206B may be an output of task 206A.

After sequencing engine 202 completes executing task 206B, sequencing engine 202 may select a next task to execute. Because task 206C is the last task in the group, sequencing engine 202 may select task 206C. Alternatively, sequencing engine 202 may use the task definition of task 206C to determine whether the input parameters of task 206C match the output parameters of task 206B. In another embodiment, sequencing engine 202 may identify task 206C as the last task because the output parameters of task 206C do not match the input parameters of other tasks in the group, such as tasks 206A-B. Once task 206C is selected, sequencing engine 202 may execute task 206C by instantiating a process, such as process 204C that executes the implementation language associated with task 206C. For illustrative purposes, process 204C may be a Python process because the implementation language for task 206C is Python. Once task 206C completes, sequencing engine 202 may determine that all tasks 206A-C in the group have been executed and generate an output. Sequencing engine 202 may transmit the output for display using analytics engine interface 106 shown in FIG. 1. The output may be the data associated with the output parameters of task 206C.

Sequencing engine 202 may use various techniques to determine the order for executing tasks. In some embodiments, sequencing engine 202 may determine the order of a sequence between tasks by identifying a match between all input parameters of one task with all output parameters of another task. For example, sequencing engine 202 may compare all output parameters of task 206A to all input parameters of tasks 206B and 206C to determine that task 206B follows task 206A. In other embodiments, sequencing engine 202 may compare a subset of output parameters in one task to a subset of input parameters of other tasks. These input and output parameters may be designated as required parameters in the task definition for determining a sequence among tasks 206A-C. In yet other embodiments, the input and output parameters may be defined as tabular data parameters. Parameters defined as tabular data parameters may be mapped to one or more tables or columns or fields in the tables in a database. To determine a match between the input parameter and output parameter defined as tabular data parameters, sequencing engine 202 may determine a match when an input parameter is mapped to a table, or columns or a field within the table and the output parameter is mapped to the same table, or column or the same field within the table.

In some embodiments, sequencing engine 202 may identify multiple tasks that have an output that matches the input of another task. In this case, sequencing engine 202 may execute the multiple tasks sequentially or in parallel. For example, suppose a task group includes tasks 206A-C. Further, suppose sequencing engine 202 determines that the output parameters of tasks 206A and 206B match the input parameters of task 206C. In this case, sequencing engine 202 may select one of tasks 206A or 206B to execute and instantiate a process that corresponds to the selected task, such as process 204A for task 206A. Once process 204A completes execution, sequencing engine 202 may execute the other task, such as task 206B using process 204B. Alternatively, sequencing engine 202 may execute tasks 206A and 206B in parallel by instantiating processes 204A and 204B. Once both tasks 206A and 206B complete, sequencing engine 202 may then execute task 206C using process 204C.

Once tasks 206A-C complete execution, sequencing engine 202 may terminate processes 204A-C. In one embodiment, sequencing engine 202 may terminate processes 204A-C after sequencing engine 202 completes execution of all tasks 206A-C in a task group. In another embodiment, after sequencing engine 202 completes execution of each one of tasks 206A-C, sequencing engine 202 may terminate the corresponding process. For example, sequencing engine 202 may terminate process 204A after process 204A completes executing task 206A, may terminate process 204B after process 204B completes executing task 206B, and so on.

Figure 3:
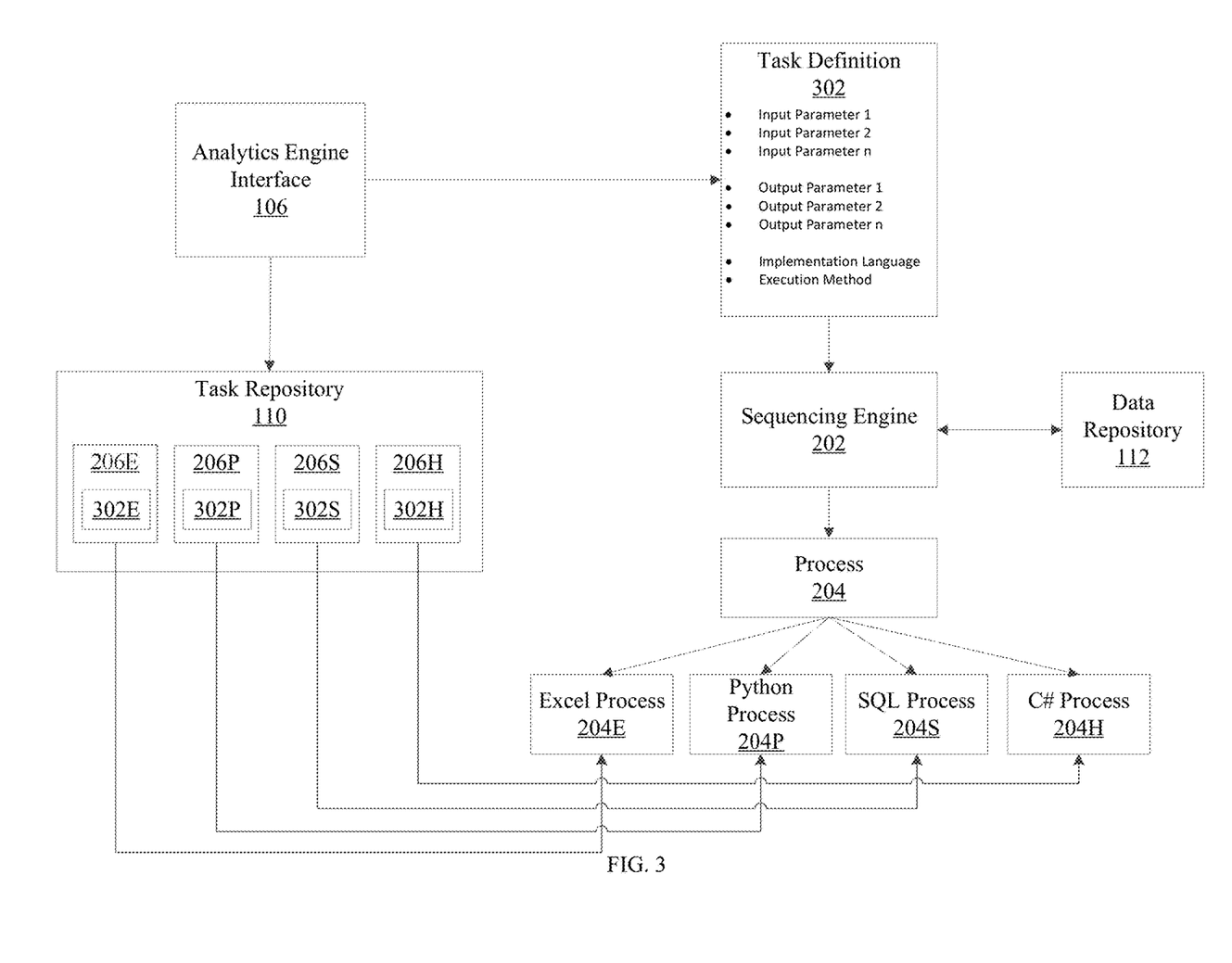

FIG. 3 is a block diagram 300 of a system that includes an analytics engine, according to an embodiment. As illustrated in FIG. 3, analytics engine interface 106 may generate task definition 302. Task definition 302 may define one or more input parameters and one or more output parameters for task 206. The input parameters may define the type of data and/or data name that task 206 receives as input. The input parameters, such as tabular data parameters, may also be linked to a table, column, or a field in the table in a database that stores the data in data repository 112. The output parameters may define the type of data or data name that task 206 generates as output. The output parameters, such as tabular data parameters, may also be linked to a table or a column name in a database that stored the output data in data repository 112. In some embodiments, task definition 302 may also define an implementation language that is used to execute task 206 or one or more methods of task 206. Once defined, task definition 302 may be stored in task repository 110, within sequencing engine 202 or another repository accessible to sequencing engine 202.

As discussed above, sequencing engine 202 may also use task definition 302 to determine when to execute task 206 in the sequence of tasks. For illustrative purposes, suppose task repository 110 may store tasks 206, such as tasks 206E, 206P, 206S, and 206H, where task 206E has methods that are implemented in Excel, task 206P has methods that are implemented in Python, task 206S has methods that are implemented in SQL, and task 206H has methods that are implemented in C#. Each of tasks 206E, 206P, 206S, and 206H may include a corresponding task definition 302E, 302P, 302S, and 302H. Once sequencing engine 202 receives a request to execute one of tasks 206E, 206P, 206S, and 206H, sequencing engine 202 may initiate an instance of process 204. The type of process 204 may depend on the implementation language included in the corresponding task definition 302. For example, task definition 302E indicates that the implementation language is Excel, sequencing engine 202 may initiate an instance of Excel process 204E that executes methods of task 206E written in Excel; if task definition 302P indicates that the implementation language is Python, sequencing engine 202 may initiate an instance of Python process 204P that executes methods of task 206P written in Python; if task definition 302S indicates that the implementation language is SQL, sequencing engine 202 may initiate an instance of SQL process 20S4 that executes methods in task 206S written in SQL; if task definition 302H indicates that the implementation language is C#, sequencing engine 202 may initiate an instance of SQL process 204S that executes methods of task 206H written in C#.

As process 204 executes, process 204 calls methods included in task definition 302 that correspond to task 206. For example, process 204E may invoke methods in task definition 302E, process 204P may invoke methods in task definition 302P, process 204S may invoke methods in task definition 302S, and process 204H may invoke methods in task definition 302H. The methods may retrieve data from data repository 112 and manipulate the data. The data in the data repository may have been stored to data repository 112 using analytics engine interface 106 or task 206 that has previously been executed by sequencing engine 202. When process 204 completes executing task 206, sequencing engine 202 may store data in data repository 112.

Figure 4:
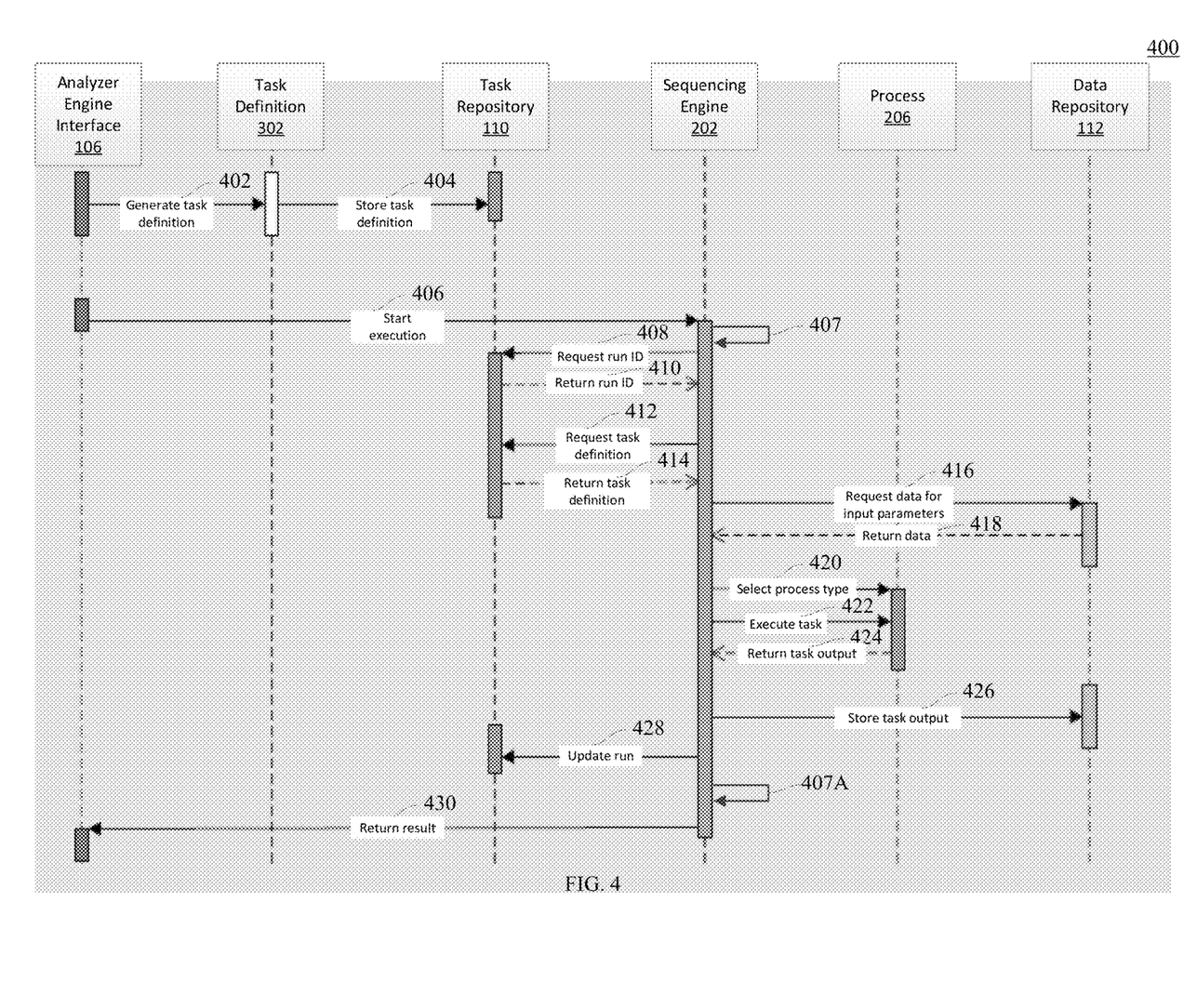
FIG. 4 is a flow diagram for creating and executing a task, according to an embodiment.

FIG. 4 is a flow diagram 400 for creating and executing a task, according to an embodiment. As illustrated in flow diagram 400, operations 402-404 describe defining task 206 and operations 406-430 describe executing task 206.

At operation 402, a task definition is created. For example, analytics engine interface 106 may receive instructions that configure task definition 302. As discussed above, task definition 302 may include input parameter(s), output parameter(s), implementation language, and execution methods.

At operation 404, task definition 302 may be stored in a memory storage, such as task repository 110 for subsequent access and retrieval by sequencing engine 202. In some embodiments, analytics engine interface 106 may store task definition 302 in task repository. In other embodiments, task definition 302 may be transmitted to task repository 110 through analytics engine 104. Along with task definition 302, different methods that are included in task definition 302 may also be stored in task repository 110.

In some embodiments, multiple tasks definitions 302 may be created using operations 402-404 discussed above. Notably, tasks 206 that are associated with task definitions 302 are typically unrelated to each other and can execute independently of each other. Each task 206 may include the implementation of the methods indicated in task definition 302.

At operation 406, an execution of one or more tasks begins. For example, analytics engine interface 106 may receive instructions to select an execution of task 206A or a group of tasks, such as tasks 206A-C. Once analytics engine interface 106 receives instructions, analytics engine interface 106 may generate a message that includes an identifier of task 206A or a group of tasks 206A-C. Analytics engine interface 106 may transmit the message to sequencing engine 202.

In operation 407, the sequencing engine 202 may determine task 206 or group of tasks 206 that may execute from an identifier in the message. In case of a single task 206 that is being executed, sequencing engine 202 may proceed to operation 408. Otherwise, sequencing engine 202 may use an identifier in the message to determine tasks 206A-C in the group of tasks 206A-C. Sequencing engine 202 may also determine that task 206A is the first task because the parameters of task 206A do not match the output parameters of other tasks 206 in the group (tasks 206B-C), and select to execute task 206A.

At operation 408, a run identifier is requested. For example, sequencing engine 202 may request a run identifier from task repository 110. A run identifier may indicate an order of executions to sequencing engine 202 once sequencing engine 202 completes executing task 206A or a group of tasks 206A-C or to access output data that is associated with each task 206. Task repository 110 may assign run identifiers sequentially, and task 206 that sequencing engine 202 executes first may be associated with a run identifier=1. The next task 206, such as task 206B, that executes may be assigned a run identifier=2. In some instances, task repository 110 may generate run identifier sequentially, and return the next run identifier in sequence to sequencing engine 202.

At operation 410, a run identifier is returned. For example, task repository 110 may return a run identifier to sequencing engine 202. Sequencing engine 202 may associate the run identifier with task 206A that sequencing engine 202 has selected to execute. In this way, once sequencing engine 202 completes executing tasks 206A-C, sequencing engine 202 may access output of the tasks 206A-C using the corresponding run identifier.

At operation 412, a task definition is requested. For example, sequencing engine 202 may request task definition 302 for task 206A selected in operation 407 from task repository 110. As discussed above, task definition 302 may include the input parameter(s), the output parameter(s), the implementation language, and method(s) or names of methods that are written in the implementation language.

At operation 414, a task definition is returned. For example, task repository 110 may return task definition 302 to sequencing engine 202.

At operation 416, data is requested. For example, sequencing engine 202 may request data from data repository 112. The data may be associated with the input parameters as defined in task definition 302 returned in operation 414.

At operation 418, data is returned. For example, data repository may return the data requested in operation 416 to sequencing engine 202. In some embodiments, the data may be associated with the run identification for sequence engine 202 to track the input and output data for each task 206A-C.

At operation 420, a process type is selected. For example, sequencing engine 202 may select a process type that corresponds to an implementation language included in task definition 302 returned in operation 414. Once sequencing engine 202 selects the process type, sequencing engine 202 may instantiate an instance of process 204 that corresponds to the process type. In this way, process 204 may execute methods of task 206A that are included in task definition 302 that are written in the implementation language included in task definition 302.

At operation 422, the process executes a task according to the task definition. For example, process 204 may execute task 206A by executing method(s) included in task definition 302 returned in operation 424. During execution, process 204 may use data retrieved in operation 418. Further, process 204 may generate output data that corresponds to output parameters included in task definition 302.

At operation 424, a task output is returned. For example, process 204 returns the result of task 206A, which may be output that corresponds to the output parameters in task definition 302 to sequencing engine 202. After process 204 returns the output to sequencing engine 202, process 204 may terminate.

At operation 426, the output is stored. For example, sequencing engine 202 may store the data that is output of task 206A in data repository 112. In some embodiments, sequencing engine 202 may associate the output with the run identifier retrieved in operation 410.

At operation 428, a run is updated. For example, sequencing engine 202 may update task repository 110 with the run identifier and an indication that task 206A completed executing.

After operation 428, in some instances, sequencing engine 202 may proceed to operation 407A, which is the same operation as operation 407. At operation 407A, sequencing engine 202 may determine a next task, such as task 206B from the group of tasks 206B-C that may be executed by matching the output parameters of task 206A with input parameters of tasks 206B-C. If sequencing engine 202 does not have other tasks in the group of tasks to execute, sequencing engine 202 may proceed to operation 430. Otherwise, operation 408 repeats for the next task, such as task 206B (not shown).

At operation 430, a result is returned. For example, sequencing engine 202 returns the data that is the output of the last task 206 in the group of tasks 206 for display to analytics engine interface 106. For illustrative purposes, the last task in the group of tasks 206A-C, may be task 206C.

Figure 5:
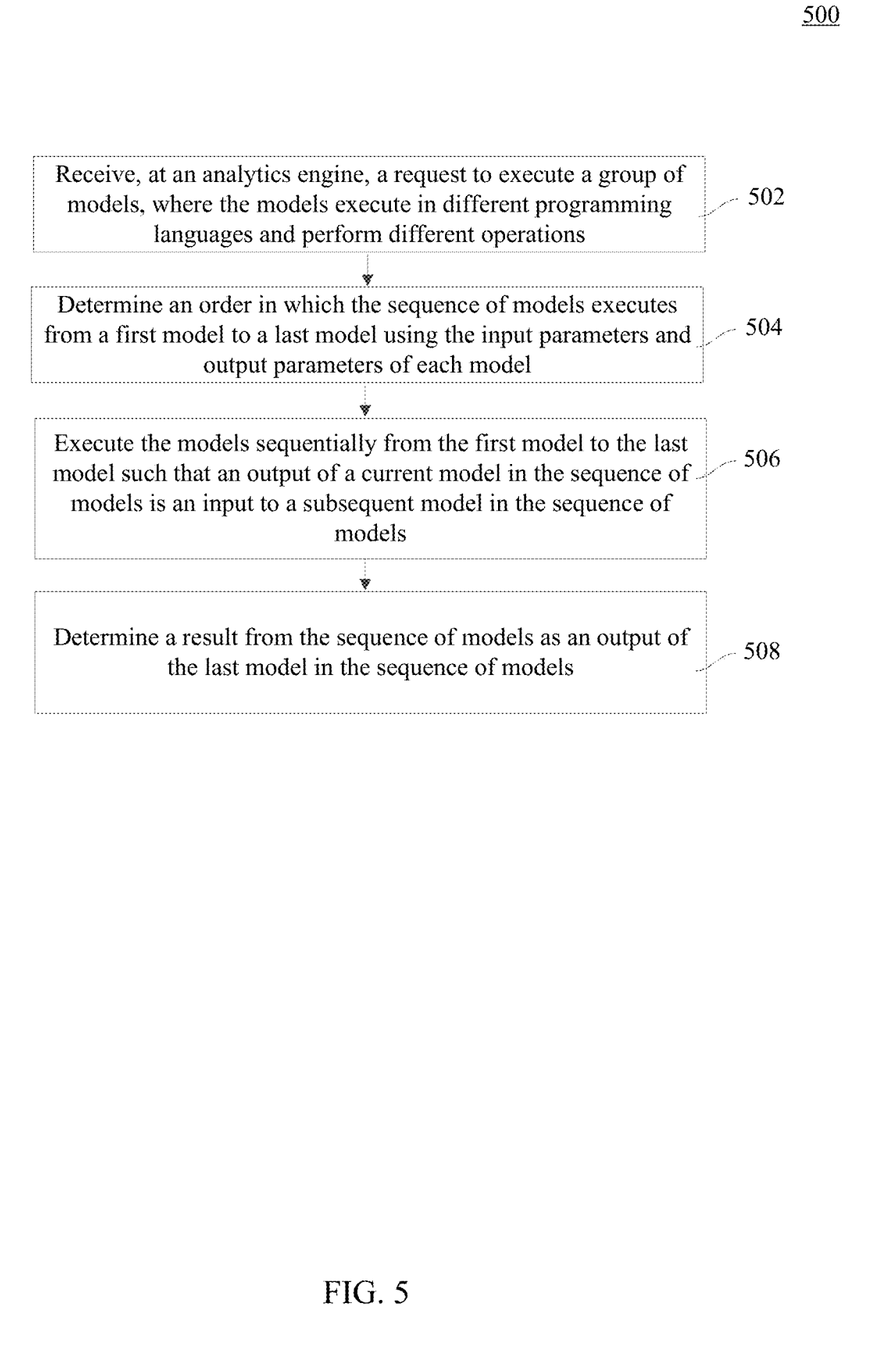
FIG. 5 is a flowchart of a method for processing a sequence of tasks that include models, according to an embodiment.
Figure 6:
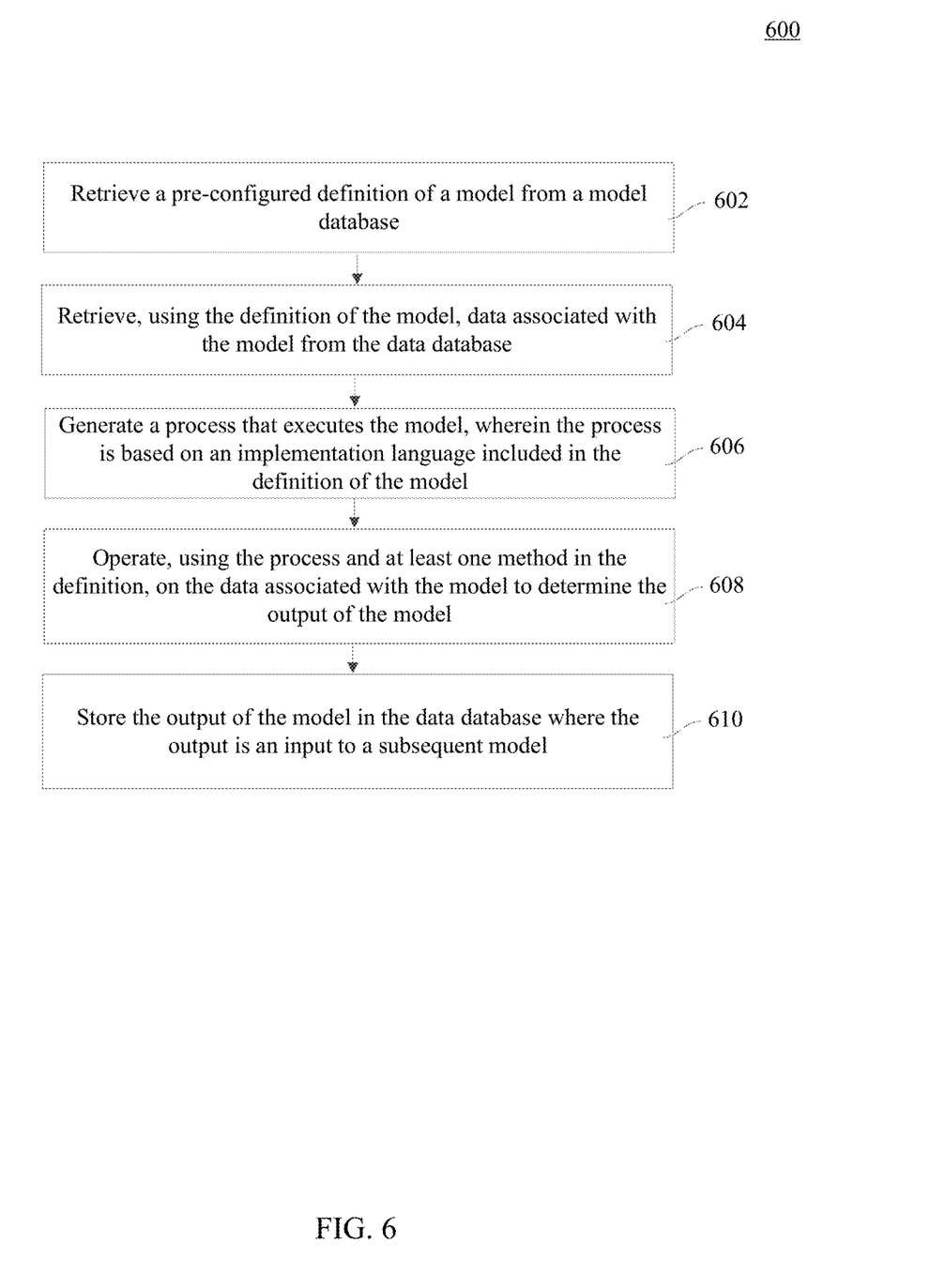
FIG. 6 is a flowchart of a method for executing a task that includes a model in the group of tasks, according to an embodiment.

Going back to FIG. 3, in some embodiments, the methods in tasks 206 may execute different models. Each model may include methods with logic that manipulates data. The data may be financial data, network data, configuration data, an algorithm that models data according to a predefined set of rules, etc. Each model and the logic in the model may be written by different entities and, as a result, may be written in different implementation languages. However, even though the models are independent, the data that is an output of one model may serve as an input to a different model. Methods 500 and 600 below describe how the data is processed automatically using a sequence of independent models that may be written in different implementation languages.

FIG. 5 is a flowchart of a method 500 for processing a sequence of models, according to an embodiment. Method 500 may be performed using hardware and/or software components described in FIGS. 1-3. Note that one or more of the operations may be deleted, combined, or performed in a different order as appropriate.

At operation 502, a request to execute a group of models is received. For example, analytics engine interface 106 may include a preconfigured group of models that are associated with an identifier. The identifier itself, however, does not indicate a sequence in which the models execute. As discussed above, the models in the group may be written in different implementation languages and may perform different tasks. The models also execute independently from other models. When analytics engine 104 receives the identifier, analytics engine 104 may determine the sequence of models in the group.

At operation 504, an order in which the sequence of models in the group execute is determined. In some embodiments, sequencing engine 202 may determine the order of the models in the group and then execute the models in the determined order as discussed in operation 506. In other embodiments, sequencing engine 202 may determine which model executes first, and then proceeds to execute the model as discussed in operation 506. After the model executes, sequencing engine 202 may return to operation 504 and determine the next model in the sequence, and so forth. As discussed above, sequencing engine 202 determines the first model in the group as a model that includes input parameters that do not match the output of the output parameters in other models in the group. Sequencing engine 202 may determine the input and output parameters of each model using a model definition, which is an implementation of task definition 302 discussed above. Sequencing engine 202 may determine the next model, by determining the input parameters of the remaining models in the group that match the output parameters of the first model. The process continues until sequencing engine 202 identifies the last model in the group. The last model may be a model that is the only model that sequencing engine 202 has not executed or the model with output parameters that do not match the input parameters of the other models in the group.

At operation 506, sequencing engine 202 initiates one or more processes that execute the models. The method for executing each model is discussed further in method 600. As the first model executes, the output of the first model may be an input to the second model, and so forth, until the last model completes execution. Operation 506 is automatic, as sequencing engine 202 determines when process 204 completes executing a first model and then instantiates the next process 204 that executes a second model, and so forth until sequencing engine 202 instantiates the last process 204 that executes the last model. As discussed above, because the models may be written in different implementation languages, sequencing engine 202 may instantiate processes 204 that corresponds to the implementation language of each model.

At operation 508, a result generated by the group of models is determined. For example, the output of the last model in the sequence of models may be the result. Once the result is generated, the output may be transmitted for display to analytics engine interface 106 and for storage to data repository 112.

FIG. 6 is a flowchart of a method 600 for executing a model in the group of models, according to an embodiment. Method 600 may be performed using hardware and/or software components described in FIGS. 1-3. Note that one or more of the operations may be deleted, combined, or performed in a different order as appropriate. Method 600 may be executed for each model in the group of models discussed in method 500.

At operation 602, a model definition is received. As discussed above, a model definition may be a particular implementation of task definition 302. The model definition may define input parameter(s), output parameter(s), an implementation language, and method(s) associated with the model. In some instances, sequencing engine 202 may retrieve the model definition from a database, such as a database included in task repository 110 or from another memory storage.

At operation 604, data is retrieved. For example, sequencing engine 202 may retrieve the data that corresponds to the input parameters in the model definition from data repository 112.

At operation 606, a process is generated. For example, sequencing engine 202 may generate an instance of process 204 to execute the model. Process 204 may correspond to an implementation language included in the model definition. In this way, process 204 may depend on the implementation language used by the model, and different types of processes 204 may be generated for models with methods written in different implementation languages. Once generated, process 204 may execute independently from sequencing engine 202.

At operation 608, the process operates on the data in the model. For example, process 204, may execute methods included in the model definition using the data retrieved in operation 604. Process 204 executes the methods until process 204 determines output that corresponds to the output parameters of the model as defined in the model definition.

At operation 610, the output is stored. For example, process 204 or sequencing engine 202 may store the output determined in operation 608 in data repository 112. In this way, the output may be retrieved as an input to a subsequent model. Alternatively, the output may be stored in sequencing engine 202 and displayed using analytics engine interface 106.

Figure 7:
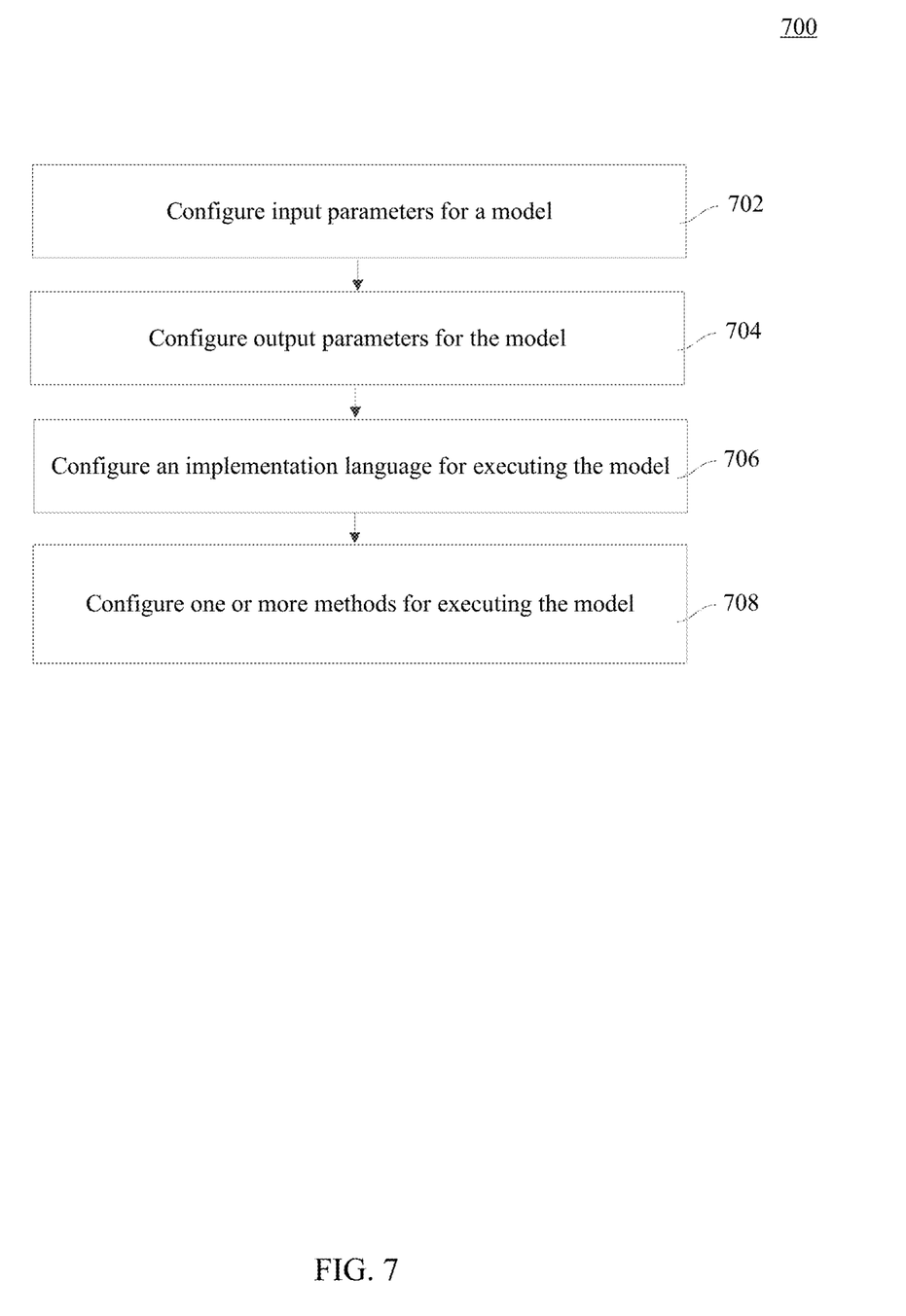
FIG. 7 is a flowchart of a method for defining a task definition that is a model definition, according to an embodiment.

FIG. 7 is a flowchart of a method 700 for configuring a model definition, according to an embodiment. Method 700 may be performed using hardware and/or software components described in FIGS. 1-3. Note that one or more of the operations may be deleted, combined, or performed in a different order as appropriate. As discussed above, the model definition is an example of task definition 302 discussed above. Accordingly, the method for configuring a model definition may also be applied to configuring task definition 302.

At operation 702, input parameter(s) are configured. For example, analytics engine interface 106 may define one or more input parameters to include in the model definition. The input parameters may indicate a location, e.g. a table or a column in the database that stores the data, and also define data types that correspond to the input parameter(s).

At operation 704, output parameters are configured. For example, analytics engine interface 106 may define one or more output parameters to include in the model definition. The output parameters may indicate a location, e.g. a table or a column in the database that stores data that is generated by the model. Output parameters may also define data types that correspond to the input parameter(s).

At operation 706, the implementation language is configured. For example, analytics engine interface 106 may configure an implementation language that corresponds to the methods in the model. As discussed above, the type of the implementation language may determine the type of process 204 that sequencing engine 202 may use to execute the model.

At operation 708, one or more methods are configured. For example, one or more methods are included in the model definition. The methods may be written in the implementation language determined in operation 706 or may be executables, scripts, etc., that correspond to the implementation language. The method(s) may be executed by process 204 to determine the output of the model. In some embodiments, the model definition may include the names of the methods, while the methods themselves maybe stored as executables or scripts in task repository 110.

Figure 8:
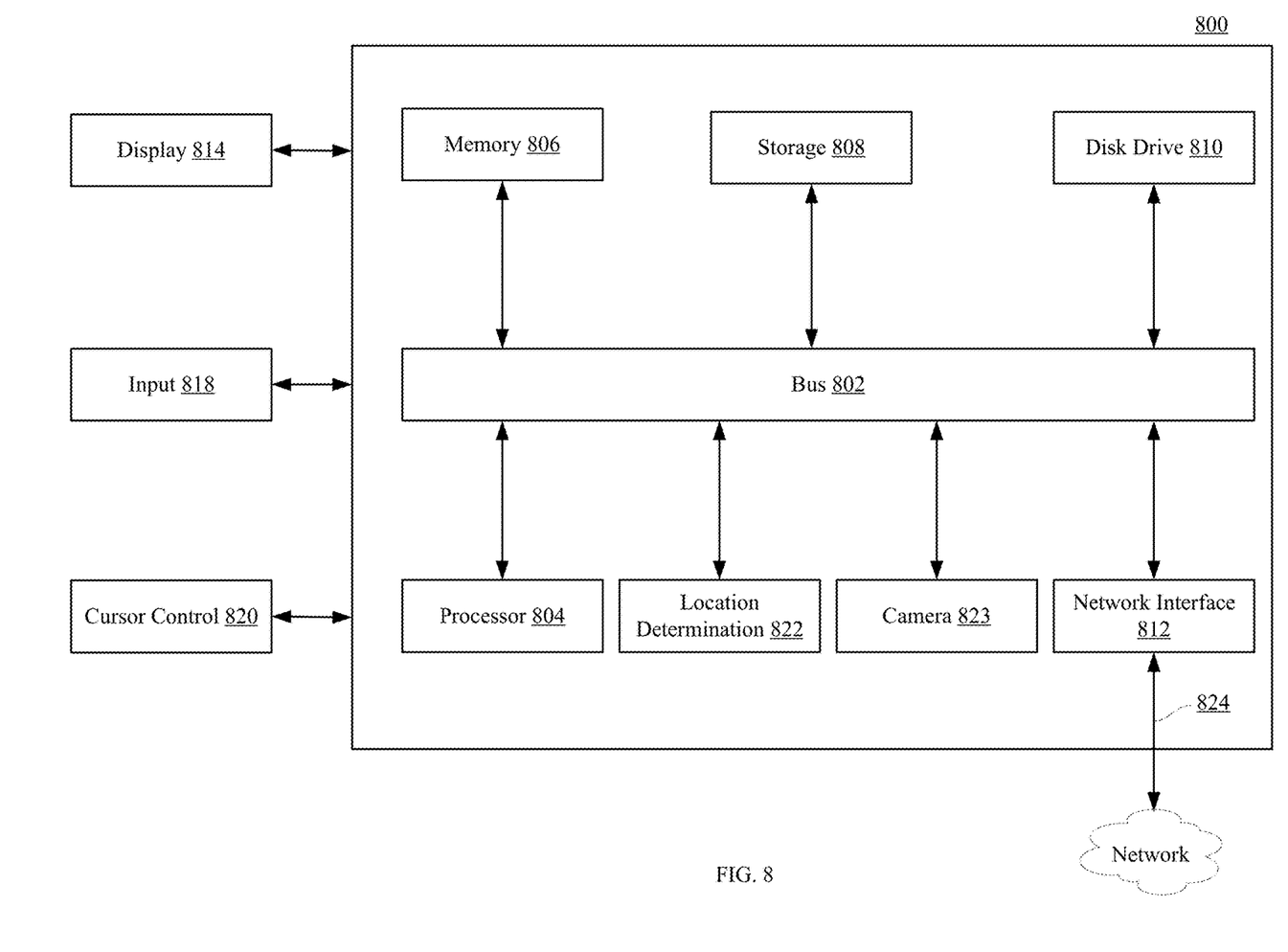
FIG. 8 is a block diagram of a computer system suitable for implementing one or more components or operations in FIGS. 1-7 according to an embodiment.

Referring now to FIG. 8 an embodiment of a computer system 800 suitable for implementing, the systems and methods described in FIGS. 1-7 is illustrated.

In accordance with various embodiments of the disclosure, computer system 800, such as a computer and/or a server, includes a bus 802 or other communication mechanism for communicating information, which interconnects subsystems and components, such as a processing component 804 (e.g., processor, micro-controller, digital signal processor (DSP), graphics processing unit (GPU), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera component 823. In one implementation, the disk drive component 810 may comprise a database having one or more disk drive components.

In accordance with embodiments of the disclosure, the computer system 800 performs specific operations by the processor 804 executing one or more sequences of instructions contained in the memory component 806, such as described herein with respect to the mobile communications devices, mobile devices, and/or servers. Such instructions may be read into the system memory component 806 from another computer readable medium, such as the static storage component 808 or the disk drive component 810. In other embodiments, hard-wired circuitry may be used in place of or in combination with software instructions to implement the disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 800. In various other embodiments of the disclosure, a plurality of the computer systems 800 coupled by a communication link 824 to the network (e.g., such as a LAN, WLAN, PTSN, and/or various other wired or wireless networks, including telecommunications, mobile, and cellular phone networks) may perform instruction sequences to practice the disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A method comprising:
 receiving, at an analytics engine executing on a processor, a request that initiates execution of tasks, wherein the tasks are programmed to execute in different programming languages;
 determining a sequence of tasks from a first task to a last task in the tasks by matching a subset of input parameters in each task to a subset of output parameters of other tasks in the tasks;
 executing the sequence of tasks from the first task to the last task, wherein executing a task in the sequence of tasks comprises:
  retrieving a pre-configured definition of the task from a memory storage;
  retrieving, using the pre-configured definition of the task, data from the memory storage;
  generating a process for executing the task, wherein a type of the process is based on an implementation language included in the pre-configured definition of the task; and
  operating, using the process and at least one execution method in the pre-configured definition of the task, on the data to determine an output that corresponds to at least one output parameter of the task; and determining a result of the sequence of tasks, wherein the result is an output of the last task in the sequence of tasks.

2. The method of claim 1, further comprising:
storing the output of the task in the memory storage, wherein the output is an input to a subsequently executing task in the sequence of tasks.

3. The method of claim 1, wherein the memory storage includes a first memory storage and a second memory storage and the pre-configured definition of the task is retrieved from the first memory storage and the data is retrieved from the second memory storage.

4. The method of claim 1, wherein the request includes an identifier that corresponds to a group of tasks to be executed.

5. The method of claim 1, wherein the first task is configured to execute a first method in a first programming language and the last task is configured to execute a second method in a second programming language different from the first programming language.

6. The method of claim 5, wherein the first task is different from the last task.

7. The method of claim 1, wherein the determining the sequence of tasks further comprises:
identifying a task that includes input parameters that do not match output parameters of the other tasks in the tasks as the first task.

8. The method of claim 1, further comprising:
configuring a pre-configured definition for the first task, wherein the pre-configured definition includes at least one input parameter and at least one output parameter of the first task.

9. The method of claim 1, further comprising:
configuring a pre-configured definition for the first task, wherein the pre-configured definition includes a programming language associated with the first task.

10. The method of claim 1, further comprising:
configuring a pre-configured definition for the first task, wherein the pre-configured definition includes at least one method that a process executes while executing the first task.

11. The method of claim 1, wherein the executing the sequence of tasks from the first task to the last task occurs automatically until the last task completes executing.

12. A non-transitory machine-readable medium having stored thereon machine-readable instructions executable to cause a machine to perform operations for executing tasks, the operations comprising:
receiving, at an analytics engine executing on a processor, a request that initiates execution of the tasks, wherein the tasks are programmed to execute in different programming languages;
determining, by matching a subset of input parameters and a subset of output parameters of each task in the tasks to other tasks in the tasks, a sequence of tasks from a first task to a last task;
executing the tasks from the first task to the last task according to the sequence of tasks, wherein the executing further comprises:
retrieving a pre-configured definition of the first task from a first memory storage;
retrieving, using the pre-configured definition of the first task, first data from a second memory storage;
generating a first process for executing the first task, wherein a type of the first process is based on a first programming language defined in the pre-configured definition of the first task;
operating, using the first process and at least one execution method in the pre-configured definition of the first task, on the first data to determine first output data;
storing the first output data in the second memory storage;
retrieving a pre-configured definition of a second task in the sequence of tasks from the first memory storage, the second task executing after the first task;
retrieving, using the pre-configured definition of the second task, second data from the second memory storage, wherein the second data includes at least part of the first output data;
generating a second process for executing the second task, wherein a type of the second process is based on a second programming language defined in the pre-configured definition of the second task; and
operating, using the second process and at least one execution method in the pre-configured definition of the second task, on the second data to determine second output data; and
determining a result of the sequence of tasks, wherein the result is as an output of the last task in the sequence tasks that is executed after the second task.

13. The non-transitory machine-readable medium of claim 12, wherein the operations further comprise:
retrieving a pre-configured definition of a third task in the sequence of tasks from the first memory storage;
retrieving, using the pre-configured definition of the third task, third data from the second memory storage, wherein the third data includes at least a portion of the second output data;
generating a third process for executing the third task, wherein a type of the third process is based on a third programming language associated with the third task, wherein the third programming language is included in the pre-configured definition of the third task; and
operating, using the third process and at least one execution method in the pre-configured definition of the third task, on the third data to determine a third output data that corresponds to at least one output parameter of the third task; and
determining the third task as the last task and the third output data as the result.

14. The non-transitory machine-readable medium of claim 12, wherein the operations further comprise:
configuring the pre-configured definition for the first task, wherein the pre-configured definition includes a programming language associated with the first task and at least one method that the first process executes while executing the first task.

15. The non-transitory machine-readable medium of claim 12, wherein the operations further comprise:
determining a subset of output parameter names of the first task;
determining that the subset of output parameter names matches a subset of input parameter names of the second task; and
selecting the second task as a next task for the sequence of tasks.

16. A system, comprising:
a non-transitory memory storing instructions; and
one or more hardware processors coupled to the non-transitory memory and configured to read the instructions from the non-transitory memory to cause the system to perform operations comprising:

receiving, at an analytics engine, a request that initiates execution of tasks, wherein at least some of the tasks are executable in different programming languages;

determining a sequence of tasks from the tasks by matching a subset of input parameters and a subset of output parameters of each task in the tasks to other tasks in the tasks from a first task to a last task, wherein the subset of input parameters and the subset of output parameters are designated as required parameters in a task definition;

executing the sequence of tasks from the first task to the last task, wherein an output of a currently executing task is an input to a subsequently executing task, wherein the executing further comprises:

generating a process for each task that corresponds to a programming language associated with each task; and executing each task using the corresponding process; and determining a result of the sequence of tasks, wherein the result is an output of the last task in the sequence of tasks.

17. The system of claim 16, wherein the operations further comprise:

retrieving a pre-configured definition for each task; and determining the programming language associated with each task from the pre-configured definition.

18. The system of claim 17, wherein the pre-configured definition for each task includes at least one method that manipulates data associated with the task.

19. The system of claim 16, wherein determining the sequence of tasks further comprises:

identifying a task that includes input parameters that do not match output parameters of the other tasks in the tasks as the first task.

20. The system of claim 16, wherein determining the sequence of tasks further comprises:

identifying a task that includes output parameters that do not match input parameters of the other tasks in the tasks as the last task.

* * * * *